United States Patent [19]
Dixon

[11] 3,720,098
[45] March 13, 1973

[54] ULTRASONIC APPARATUS AND METHOD FOR NONDESTRUCTIVELY MEASURING THE PHYSICAL PROPERTIES OF A SAMPLE

[75] Inventor: Norman E. Dixon, Pasco, Wash.

[73] Assignee: The United States of America as represented by the United States Atomic Energy Commission

[22] Filed: March 22, 1971

[21] Appl. No.: 126,712

[52] U.S. Cl. ................................................ 73/67.7
[51] Int. Cl. ............................................ G01n 29/00
[58] Field of Search ................ 73/67.7, 67.6, 67.5

[56] References Cited

UNITED STATES PATENTS 3,127,950  4/1964  Itria ............................... 73/67.5 X
3,512,400  5/1970  Lynnworth ....................... 73/67.5

OTHER PUBLICATIONS

Fitch & Chettle, "Critical Angle Ultrasonic Tests," 12/31/1963, AEC Red RPT No. HW-79928.

Primary Examiner—Richard C. Queisser
Assistant Examiner—Arthur E. Kerkosz
Attorney—Roland A. Anderson

[57] ABSTRACT

The physical properties of a sample are measured by generating a collimated beam of pulsed ultrasound and transmitting the ultrasound at an incident angle relative the sample greater than the longitudinal-ultrasonic-wave critical angle and less than the longitudinally induced-shear-ultrasonic-wave critical angle for the sample to generate simultaneously within the sample longitudinal and mode-converted-shear ultrasonic waves. The propagation of the generated longitudinal and shear ultrasonic waves through the sample is measured to provide a measure of the physical properties of the sample.

11 Claims, 4 Drawing Figures

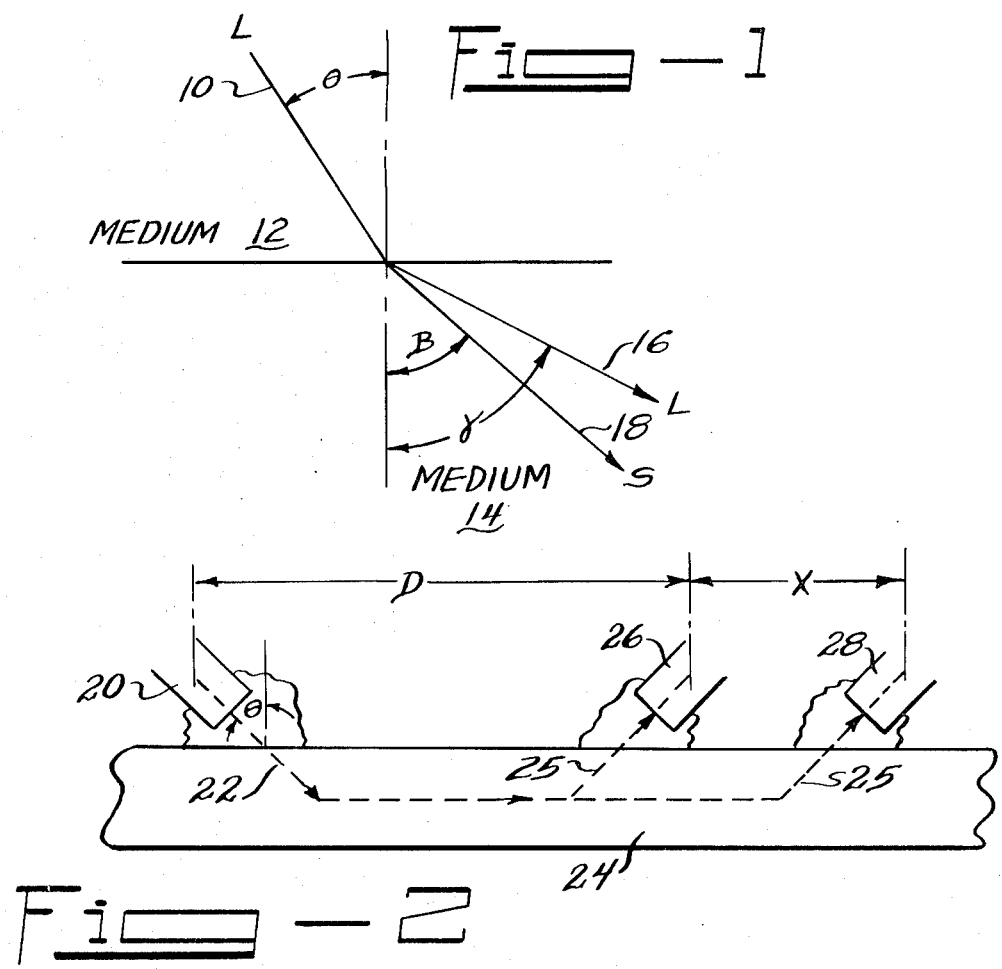
FIG-1
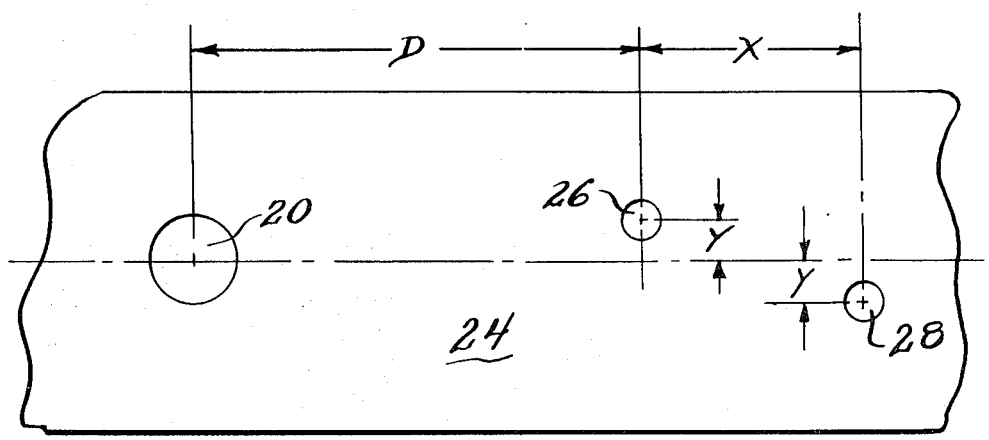
FIG-2
FIG-3
Inventor
Norman E. Dixon
Attorney

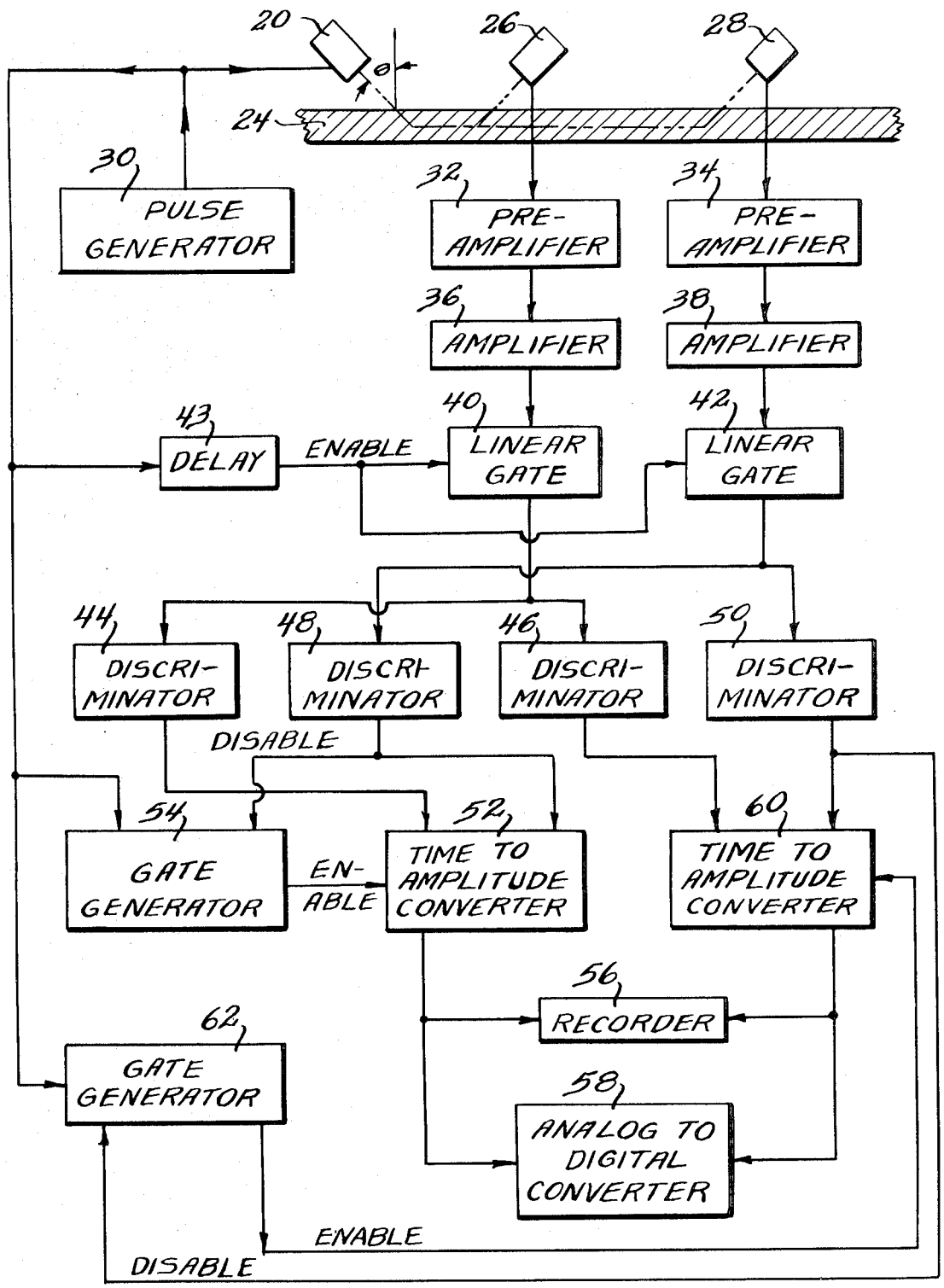

ULTRASONIC APPARATUS AND METHOD FOR NONDESTRUCTIVELY MEASURING THE PHYSICAL PROPERTIES OF A SAMPLE

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

The present invention relates to nondestructive testing techniques and more particularly to an ultrasonic method and means for nondestructively measuring the physical properties of a sample.

The characteristics of ultrasonic waves as they propagate through a sample are related to the mechanical properties of the sample and thus can be used to measure the physical properties of the sample. In measuring certain physical properties of a sample using ultrasonic waves, it is necessary to measure the velocity of both longitudinal and shear waves as they propagate through the sample. Further, it is often desirable to propagate longitudinal and shear waves simultaneously through the sample. Such requirements may be found in measuring the elastic properties of a sample, such as Young's modulus, Poisson's ratio, Shear modulus, Bulk modulus and Polar modulus. Heretofore, to generate simultaneously longitudinal and mode-converted shear ultrasonic waves in a sample from a single transmitting ultrasonic transducer, it has been necessary to use lenses and other devices to cause the ultrasound impinging on the surface of the sample to impinge thereon at a spectrum of incident angles whereby refraction takes place in the sample to generate simultaneously longitudinal waves and mode-converted shear waves. The generation of incident angles for the ultrasound in this technique is quite complex. Further, the detection of refracted ultrasound to determine the propagation of the longitudinal and mode-converted shear waves through the sample is also complex.

It is therefore an object of the present invention to provide a method and means for the generation of longitudinal and mode-converted shear ultrasonic waves within a sample from ultrasound impinging on the surface of a sample at a single incident angle thereto.

It is another object of the present invention to provide an improved ultrasonic method and means for nondestructively testing a sample.

It is another object of the present invention to provide an improved ultrasonic method and means for measuring the elastic properties of a sample.

It is another object of the present invention to provide an improved method and means for simultaneously generating in a sample longitudinal and mode-converted shear ultrasonic waves.

Other objects of the present invention will become more apparent as the detailed description proceeds.

In general, in the present invention the physical properties of a sample are measured by generating and transmitting a beam of ultrasound to impinge on the surface of the sample at an incident angle thereto greater than the longitudinal-ultrasonic-wave critical angle for the sample and less than the longitudinally-induced-shear-ultrasonic-wave critical angle to propagate simultaneously within the sample longitudinal and mode-converted shear ultrasonic waves. The propagation of the longitudinal and mode-converted shear ultrasonic waves through the sample is measured to provide a measure of the physical properties of the sample.

Further understanding of the present invention may best be obtained from the accompanying drawings wherein:

FIG. 1 is a sketch of the propagation of ultrasound in two different mediums;

FIG. 2 is a side view of an apparatus according to the present invention propagating ultrasound in a test sample;

FIG. 3 is a top view of the apparatus in FIG. 2;

FIG. 4 is a block diagram of an apparatus for the practice of the present invention;

Understanding of the present invention may be enhanced by considering FIG. 1. In FIG. 1, a longitudinal ultrasonic beam 10 is shown passing through a medium 12 to impinge on the surface of a second medium 14. The ultrasonic beam 10 impinges on the surface of medium 14 at an incident angle $\theta$ with respect thereto. The incident angle $\theta$ is defined as the angle formed between the beam 10 and a plane normal to the surface of the medium 14. The ultrasonic beam 10 incident upon the surface of medium 14 is refracted and, dependent upon the angle $\theta$, generates longitudinal ultrasonic waves 16 or mode-converted shear ultrasonic waves 18 in the medium 14. The directions and velocities of these ultrasonic waves are related to one another according to Snell's law, that is, $$\sin \theta / V_{L10} = \sin \beta / V_{S18} = \sin \gamma / V_{L16}$$

The generated shear and longitudinal ultrasonic waves 16 and 18 travel along the medium 14 causing refracted ultrasonic waves to be transmitted from the surface of medium 14 back into medium 12 at the mirror-image angle to incident angle $\theta$.

As the angle $\theta$ is increased from where the longitudinal ultrasonic beam 10 is normal to the surface of medium 14, the aforedescribed refracted longitudinal and mode-converted shear ultrasonic waves 16 and 18 will be generated in the medium 14. This condition exists until the angle $\theta$ achieves a value equal to $\theta_{LC}$. This angle, $\theta_{LC}$, is defined as the longitudinal-ultrasonic-wave critical angle and is the angle at which the longitudinal ultrasonic waves 10 are incident to the surface of medium 14 to propagate the longitudinal waves 16 parallel to the surface of the medium 14. That is, longitudinal ultrasonic waves are not propagated through the material of medium 14. As the incident angle $\theta$ increases beyond $\theta_{LC}$, the longitudinal ultrasonic beam 10 incident on the medium 14 generates mode-converted shear ultrasonic waves through the medium 14 as hereinbefore described. This propagation takes place until the angle $\theta$ achieves a value $\theta_{SC}$, herein defined as the longitudinally-induced-shear-ultrasonic-wave critical angle. At the value of $\theta_{SC}$, the mode-converted shear waves propagate parallel to the incident surface of medium 14. The aforedescribed critical angles $\theta_{LC}$ and $\theta_{SC}$ have been described in their conventional sense in the art. Thus, in the art it is believed that refracted longitudinal and mode-converted shear ultrasonic waves are propagated in the medium 14 up to the value $\theta_{LC}$ and between the value $\theta_{LC}$ and $\theta_{SC}$ only mode-converted shear ultrasonic waves are propagated in the medium 14. In the practice of the present invention, it has been found that where the longitudinal ultrasonic beam 10 is caused to impinge on the surface of medium 14 at an angle $\theta$ slightly below the longitudinally induced-shear-ultrasonic-wave critical angle $\theta_{SC}$ and above the longitudinal-ultrasonic-wave critical angle $\theta_{LC}$, then both longitudinal ultrasonic waves 16 and mode-converted shear ultrasonic waves 18 will be simultaneously propagated through the medium 14.

In FIGS. 2 and 3, propagation of ultrasound according to the practice of the present invention is illustrated. A transducer 20 is excited in a pulsed mode to transmit a pulsed collimated plane-wave longitudinal ultrasonic beam 22 to impinge at an incident angle $\theta$ on the surface of a test sample 24. The incident angle $\theta$ is chosen in the manner hereinbefore described so that it lies between the longitudinal critical angle $\theta_{LC}$ and the longitudinally induced-shear-wave critical angle $\theta_{SC}$ for the sample 24. At this particular angle, longitudinal ultrasonic waves and longitudinally induced shear ultrasonic waves will be simultaneously propagated through the sample 24. The longitudinal and shear ultrasonic waves will propagate down the sample 24 parallel to the surface thereof and will be refracted to generate ultrasound 25 from the sample 24 at the mirror angle to incident angle $\theta$. This ultrasound 25 is detected by receiving transducers 26 and 28.

The receiving transducer 26 is spaced a distance D from the transmitting transducer 20 sufficient to permit the refracted ultrasound being propagated through the sample 24 to settle down into homogeneous ultrasonic waves. The two receiving transducers 26 and 28 are separated from each other a predetermined known distance X and are spaced a distance Y off the center line of the refracted ultrasound being propagated down the sample 24.

With the simultaneous generation of longitudinal and shear ultrasonic waves within the sample 24 and the known displacement X of the receiving transducers 26 and 28, the velocity of longitudinal ultrasound ($V_L$) and the velocity of shear ultrasound ($V_S$) through the sample 24 may be determined from the formulas:

$$V_L = X/(T_{L28} - T_{L26})$$

and $$V_S = X/(T_{S28} - T_{S26})$$

where
 $V_L$ = the longitudinal ultrasonic wave velocity in the sample 24,
 $V_S$ = the velocity in the sample 24 of shear ultrasound generated by mode converting the longitudinal ultrasound of beam 22,
 $T_{L28}$ is the time of detection of the pulsed longitudinal ultrasound by receiving transducer 28,
 $T_{L26}$ is the time of detection of the pulsed longitudinal ultrasound by receiving transducer 26,
 $T_{S28}$ is the time of detection of the pulsed shear ultrasound by receiving transducer 28,
 $T_{S26}$ is the time of receiving the pulsed shear ultrasound by receiving transducer 26, and
 X = the distance between the transducers 26 and 28 in the direction of propagation of the shear and longitudinal ultrasound through the sample 24.

Using these velocities and transit times, the elastic properties of the sample 24 such as, Poisson's ratio, Shear modulus, Young's modulus, Bulk modulus, and Polar modulus, may be readily determined.

In determining Poisson's ratio according to the present invention, the following formula is used:

$$\sigma = (1-2)(V_S/V_L)^2/(2-2)(V_S/V_L)^2$$

where
 $V_S$ = the velocity of longitudinal waves within the sample 24, and
 $V_L$ = the velocity of shear waves within the sample 24.

$V_S$ and $V_L$ are determined as hereinbefore described by measuring the transit time of the longitudinal and shear ultrasonic waves through the sample 24. It is to be noted that in the formula for Poisson's ratio according to the measurement techniques of the present invention, the distance X between the receiving transducers is the same for both $V_S$ and $V_L$ and thus cancels in the above formula so that only the relative transit times are necessary for determining Poisson's ratio. Thus, in the practice of the present invention Poisson's ratio thus becomes $$\sigma = \frac{1 - 2\left(\frac{T_{L28} - T_{L26}}{T_{S28} - T_{S26}}\right)^2}{2 - 2\left(\frac{T_{L28} - T_{L26}}{T_{S28} - T_{S26}}\right)^2}$$

Shear modulus is determined from the formula $\mu = \rho(V_S)^2$
where
 $\rho$ = the density of the material 24 and
 $V_S$ = the velocity of shear ultrasound in the sample 24 and may be determined as hereinbefore described.

Young's modulus may be determined from the formula $Y_o = 2\mu(1 + \sigma)$
where
 $\mu$ = the Shear modulus of the sample 24 and
 $\sigma$ = Poisson's ratio for the sample 24.

Further, Young's modulus may be also determined by the formula $$Y_o = (V_L)^2 \rho [(1 + \sigma)(1 - 2\sigma)/(1 - \sigma)]$$

where
 $Y_o$ = the value of Young's modulus,
 $V_L$ = the velocity of longitudinal ultrasonic sound in the sample 24 and is determined by the aforedescribed method,
 $\rho$ = the density of the sample,
 $\sigma$ = Poisson's ratio of the sample 24 as measured by the aforedescribed method.

The density $\rho$ of the test sample 24 may be approximated from known values for the material of the sample or it may be accurately determined by known conventional techniques for the particular sample under test.

The Polar modulus of the sample 24 is determined according to the present invention from the formula $$\bar{E} = (V_L)^2 \rho$$

where
 $\bar{E}$ = the value of Polar modulus, $V_L$ = the velocity of ultrasound in the sample 24 determined from the method hereinbefore described and $\rho$ = the density of the sample 24.

The Bulk modulus of the material is determined from the formula $$K = Y_o/3(1 - 2\sigma)$$

where $K$ = the Bulk modulus value of the sample 24, $Y_o$ = the value of Young's modulus for the sample 24 and $\sigma$ = the value of Poisson'ratio for the material 24.

Thus, it is apparent that by measuring the transit times of simultaneously generated pulsed shear and longitudinal waves within the test sample 24, one may readily obtain therefrom the elastic property values of the material 24.

Turning to FIG. 4, a block diagram is shown for an apparatus where the aforedescribed refracted ultrasonic wave pulses are detected and the transit times thereof through the sample 24 measured to give the desired elastic properties of the test sample 24.

In FIG. 4, the transducer 20 is positioned relative the sample 24 to transmit a collimated plane-wave pulsed longitudinal ultrasonic beam to the sample 24 at an incident angle $\theta$ with respect thereto greater than the longitudinal critical angle $\theta_{LC}$ for the sample 24 and less than the shear critical angle $\theta_{SC}$ for the material 24. The two transducers 26 and 28 are positioned to detect refracted ultrasonic waves from the sample 24 as previously described in FIGS. 2 and 3.

A pulse generator 30 drives the transducer 20 to transmit the pulsed ultrasound to the sample 24. As previously described, the pulsed ultrasound from the transducer is refracted by the surface of the sample 24 and simultaneously generates in the sample 24 longitudinal and shear ultrasound which propagates down the sample and generates refracted ultrasound from the sample which is detected by the receiving transducers 26 and 28. The pulsed longitudinal ultrasound propagating through the sample 24 travels at a velocity faster than the mode-converted shear ultrasound also propagating through the sample 24. Since both the longitudinal and shear ultrasonic waves are generated simultaneously in sample 24, the refracted ultrasound generated by the pulsed longitudinal ultrasonic waves traveling through the sample 24 will reach the transducers 26 and 28 prior to the pulsed refracted ultrasound from the shear ultrasonic waves propagating through the sample 24. Thus, the transducer 26 will first see a pulse of refracted ultrasound from the longitudinal ultrasonic waves propagating in the sample 24 and then it will see a pulse of refracted ultrasound from the shear ultrasonic waves propagating through the sample 24. Similar conditions will be observed by the transducer 28.

The outputs from the transducers 26 and 28 are fed through preamplifiers 32 and 34 and amplifiers 36 and 38 to linear gates 40 and 42 respectively. The pulsed output from generator 30 is also fed via a delay circuit 43 to the linear gates 40 and 42 to enable the gates prior to the arrival of the refracted pulse from the longitudinal ultrasound propagating through the sample 24. The linear gates 40 and 42 are of conventional design, such as the EG and G Inc. Linear Gate Model LG-100. These gates have an "internal off." The "internal off" for the linear gate 40 is set so that the linear gate 40 passes the detected pulses refracted from the longitudinal and shear waves, that is the pulses hereinbefore referenced as $T_{L26}$ and $T_{S26}$. Similarly, the "internal off" of linear gate 42 is set so that linear gate 42 passes the refracted pulses from the longitudinal and shear waves propagating in sample 24 and which as hereinbefore been referenced as $T_{L28}$ and $T_{S28}$. The output from linear gate 40 is fed to the input of discriminators 44 and 46 and the output from linear gate 42 is fed to the input of discriminators 48 and 50. The discriminators 44 through 50 are of conventional design, such as EG and G Inc. Model T-101. The refracted ultrasound detected by transducers 26 and 28 from longitudinal ultrasonic waves propagating in the sample 24 is less in amplitude than the refracted ultrasound from the shear ultrasonic waves propagating in sample 24. Accordingly, the detected refracted ultrasound may be amplitude discriminated to effect separation of detected refracted ultrasound resulting from shear and longitudinal ultrasonic waves propagating in the sample 24.

The level of discriminators 44 and 48 are set to accept only the larger amplitude refracted ultrasonic pulses generated by shear ultrasonic waves propagating through the sample 24. Thus, the output pulses from discriminator 44 are representative of refracted ultrasound generated by pulsed shear waves traveling through the sample 24 and detected by transducer 26 (i.e. $T_{S26}$). Similarly, the output from discriminator 48 is representative of refracted ultrasound generated by pulsed shear waves propagating through the sample 24 and detected by transducer 28 (i.e. $T_{S28}$). The output from discriminators 44 and 48 are fed to the two inputs of a time-to-amplitude converter 52. The output from the pulse generator 30 is also fed to the input of a gate generator 54. The gate generator is of the type EG and G Inc. Model GG-200 and provides an enabling pulse to the time-to-amplitude converter 52. The time-to-amplitude converter 52 is enabled by gate generator 54 to accept the output pulses $T_{S28}$ and $T_{S26}$ from discriminators 48 and 44 and generates an output pulse whose amplitude is proportional to the time difference therebetween. The time-to-amplitude converter 52 is of conventional design, such as EG and G Inc. Model TAC No. TH-200A. The output from discriminator 48 is also fed to gate generator 54 to enable the gate and hence the time-to-amplitude converter 52. The output of the time-to-amplitude converter 52 is fed to a recorder 56 and to an analog-to-digital converter 58 which displays the time difference signal in digital figures. Thus, the output from time-to-amplitude converter 52 is a signal which is proportional to the time difference of the received pulses of transducers 28 and 26 generated by pulsed shear ultrasonic waves propagating through the sample 24 (i.e. $T_{S28} - T_{S26}$).

The discriminators 46 and 50 have their levels set such that they pass the refracted ultrasound detected by transducers 26 and 28 from the longitudinal and shear ultrasonic waves propagating through the sample 24. Since as previously recited longitudinal ultrasonic waves propagate faster in the sample 24 than shear ultrasonic waves, the first pulses detected by the transducers 26 and 28 will be refracted ultrasonic pulses generated by longitudinal ultrasonic waves propagating in the sample 24. Detection of these pulses by transducers 26 and 28 may thus be used to determine the time difference therebetween. The output from discriminators 46 and 50 are fed to the two inputs of a second time-to-amplitude converter 60. The output from pulse generator 30 is also fed to a gate generator 62 which enables the time-to-amplitude converter 60. The gate generator 62 and time-to-amplitude converter 60 are the same as gate generator 54 and time-to-amplitude converter 52. The gate generator 62 enables the time-to-amplitude converter 60 prior to the arrival of the first refracted ultrasonic pulse detected by transducer 26. The first refracted ultrasonic pulse detected by transducer 26 turns on the time-to-amplitude converter and the first refracted ultrasonic pulse detected by transducer 28 turns off the time-to-amplitude converter to produce an output pulse therefrom having an amplitude proportional to the time difference between these two pulses. Thus, since the first refracted ultrasonic signal detected by transducers 26 and 28 are ultrasonic pulses refracted by longitudinal ultrasonic traveling through sample 24, the amplitude pulse output from the time-to-amplitude converter 60 is proportional to the time difference of the pulsed-ultrasound propagation through the sample 24 as detected by the transducers 26 and 28 (i.e. $T_{L26}$ and $T_{L28}$). The first pulse output from discriminator 50 ($T_{L28}$) is also fed to the gate generator 62 to disable the gate 62 and hence the time-to-amplitude converter 60. The output of the time-to-amplitude converter is fed to the recorder 56 and to the analog-to-digital converter 58 which provides a digital output signal representative of the time difference of the detected refracted ultrasonic waves generated by longitudinal wave propagation through the sample 24 ($T_{L28} - T_{L26}$).

As previously noted in the practice of the present invention, the transmitting transducer is aligned relative the surface of the sample such that collimated ultrasound from the transducer impinges on the surface of the test sample at an incident angle $\theta$ with respect thereto, where $\theta$ lies between the longitudinal ultrasonic critical angle ($\theta_{LC}$) and the shear critical angle ($\theta_{SC}$) for the material of the sample. It has been found that this angle $\theta$ is generally between 1° and 8° below the critical shear angle ($\theta_{SC}$). To ascertain the optimum angle $\theta$ for simultaneous generation of longitudinal and shear ultrasonic waves within a test sample an oscilloscope may be connected to the output of the transducers 26 and 28 and the refracted ultrasound from the simultaneously generated shear and longitudinal waves visually observed. It has been found that the homogeneous longitudinal ultrasonic waves generated at the angle $\theta$ between $\theta_{LC}$ and $\theta_{SC}$ have a velocity $V_L$ equal to the velocity of longitudinal ultrasonic waves propagated in the sample by ultrasound impinging on the sample below but near $\theta_{LC}$.

Using a half-inch diameter transducer transmitting collimated ultrasound through an RTV couplant into a test sample and two 3/16 inch diameter receiving transducers spaced 1 inch apart in the direction of the propagation of the ultrasound and displaced in opposite directions off the transmitted-beam center-line one-half of their diameter, the following results were obtained. For a graphatized carbon vapor-deposition felt sample, longitudinal and shear waves were simultaneously propagated in the sample at velocities of 115 mils per microsecond and 61 mils per microsecond respectively with the transmitting transducer aligned relative the surface of the sample at an incident angle of 40°. The critical longitudinal angle ($\theta_{LC}$) for the sample was 20.9°. The critical shear angle ($\theta_{SC}$) for the sample was 42.5°. Using the aforedescribed techniques, a Shear modulus of $0.46 \times 10^{-6}$ pounds per inch square was measured for the sample. Similarly, a Young's modulus and Polar modulus of $1.2 \times 10^{-6}$ and $1.65^{-6}$ pounds per inch square respectively were also measured. Poisson's ratio for the sample was found to have a value of 0.304.

Where aluminum is the test sample, the longitudinal ultrasonic critical angle is 13.5° and the shear critical angle is 30°. For the practice of the present invention to simultaneously generate both longitudinal and shear ultrasound within the sample, the ultrasonic beam from the transmitting transducer should have an incident angle with respect to the surface of the test sample of 28°.

Persons skilled in the art will, of course, readily adapt the teachings of the present invention to embodiments far different than those illustrated and described above. Accordingly, the scope of protection afforded the present invention, should not be limited to the particular embodiments and methods described and shown above but should be determined only in accordance with the appended claims.

The embodiments of the invention in which an exclusive property or privilege is claimed are defined as follows:

1. An apparatus for nondestructively testing a sample comprising means for generating an ultrasonic plane wave, means for transmitting said ultrasonic wave to impinge on the surface of said sample at an incident angle with respect thereto greater than the longitudinal-wave critical angle and less than the shear-wave critical angle therefor to simultaneously generate homogeneous longitudinal and shear ultrasonic waves within said sample, said longitudinal and shear ultrasonic waves traveling along said sample, each of said longitudinal and shear waves refracting ultrasound from said sample, and means for detecting said refracted ultrasound of each of said longitudinal and shear waves to measure the propagational velocity of each of said longitudinal and shear waves to provide a measure of the physical properties of said sample.

2. The apparatus according to claim 1 wherein said ultrasonic-wave generating and transmitting means comprise a pulse generator, transmitting-transducer means electrically connected to said pulse generator and mounted to generate and transmit pulsed ultrasonic plane waves incident on the surface of said sample at an angle with respect thereto greater than the longitudinal-wave critical angle of said sample and less than the shear-wave critical angle of said sample to simultaneously generate in said sample pulsed longitudinal and shear ultrasonic waves, said pulsed longitudinal and shear ultrasonic waves traveling along said sample parallel to the surface thereof refracting pulsed ultrasonic waves therefrom.

3. An apparatus for nondestructively testing a sample comprising a pulse generator, transmitting transducer means electrically connected to said pulse generator and mounted to generate and transmit pulsed ultrasonic plane waves incident on the surface of said sample at an angle with respect thereto greater than the longitudinal-wave critical angle of said sample and less than the shear-wave critical angle of said sample to simultaneously generate in said sample homogeneous pulsed longitudinal and shear ultrasonic waves, said pulsed longitudinal and shear ultrasonic waves travelling along said sample parallel to the surface thereof refracting pulsed ultrasonic waves therefrom, first receiving-transducer means mounted to receive said refracted pulsed ultrasonic waves from said sample, second receiving-transducer means mounted to receive said refracted pulsed ultrasonic waves from said sample, said first and second receiving-transducer means being spatially separated with respect to each other a predetermined distance in the direction of propagation of said pulsed longitudinal and shear ultrasonic waves in said sample, and means for measuring the reception-time-detection of said refracted pulsed ultrasonic waves from said sample by said first and second receiving-transducer means, which reception-time-detection is a measure of the physical properties of said sample.

4. The apparatus according to claim 3 wherein said means for measuring said reception-time-detection of said refracted pulsed ultrasonic waves from said sample comprises means responsive to each of said transmitted pulsed ultrasonic plane waves for measuring the time differential of the first refracted pulsed ultrasonic waves detected by each of said first and second receiving-transducer means, and means responsive to each of said transmitted pulsed ultrasonic plane waves for measuring the time differential of the second refracted pulsed ultrasonic waves detected by each of said first and second receiving-transducer means, which time differential measurements are a function of the physical properties of said sample.

5. The apparatus according to claim 1 wherein said ultrasonic-wave generating and transmitting means and said refracted ultrasound detecting means comprise a pulse generator, a transmitting transducer electrically connected to said generator and mounted relative the surface of said sample to transmit pulsed ultrasound at an incident angle thereto greater than the longitudinal-wave critical angle of said sample and less than the shear-wave critical angle of said sample to generate simultaneously in said sample pulsed homogeneous longitudinal and shear ultrasonic waves, said pulsed longitudinal ultrasonic waves traveling along said sample refracting pulsed ultrasonic waves therefrom, said pulsed shear ultrasonic waves traveling along said sample at a slower velocity than said pulsed longitudinal waves and refracting pulsed ultrasonic waves from said sample having a smaller amplitude than said refracted pulsed ultrasonic waves from said pulsed longitudinal waves, a first receiving transducer mounted to detect said refracted pulsed ultrasonic waves, a second receiving transducer mounted to detect said refracted pulsed ultrasonic waves and spatially separated from said first receiving transducer a predetermined distance in the direction of propagation of said pulsed longitudinal and shear ultrasonic waves in said sample, and means connected to said first and second transducers for measuring the time-detection differential between refracted pulsed ultrasonic waves generated by said longitudinal ultrasonic waves and the time-detection differential between refracted pulsed ultrasonic waves generated by said shear ultrasonic waves, which measured time-detection differentials are a measure of the physical properties of said sample.

6. The apparatus according to claim 5 wherein said time-detection differential measuring means for said refracted pulsed ultrasonic waves comprises means connected to said first and second receiver transducers for measuring responsive to each of said transmitted pulsed ultrasonic plane waves the time differential of the first refracted pulsed ultrasonic waves detected by said first and second transducers, and amplitude-discriminating means connected to said first and second receiver transducers for measuring responsive to each of said transmitted pulsed ultrasonic plane waves the time differential of the refracted pulsed ultrasonic waves generated by said pulsed shear ultrasonic waves and detected by said first and second transducers, which measured time differentials are a measure of the physical properties of said sample.

7. A method for nondestructively measuring the physical properties of a sample comprising generating a collimated beam of ultrasound, transmitting said generated ultrasonic beam at an incident angle relative to said sample greater than the longitudinal-wave critical angle and less than the shear-wave critical angle therefor to generate simultaneously within said sample homogeneous longitudinal and shear ultrasonic waves, and measuring the propagational velocity of each of said simultaneously generated longitudinal and shear waves traveling through said sample parallel to the surface thereof to provide a measure of the physical properties of said sample.

8. The method according to claim 7 wherein said ultrasonic beam generation is effected in a pulsed mode to provide simultaneous generation of pulsed longitudinal and shear ultrasonic waves in said sample.

9. The method according to claim 8 wherein said ultrasound propagation measuring step comprises measuring the transit time of each of said pulsed longitudinal and shear ultrasonic waves through a like distance of said sample, which transit times are a measure of the physical properties of said sample.

10. The method according to claim 9 wherein said sample material is graphatized carbon vapor-deposition felt and said collimated beam of ultrasound is transmitted to impinge on the surface of said sample at an angle of 42.5°.

11. The method according to claim 9 wherein said sample material is aluminum and said collimated beam of ultrasound is transmitted to impinge on the surface of said sample at an angle of 28°.

* * * * *